Figure 1:
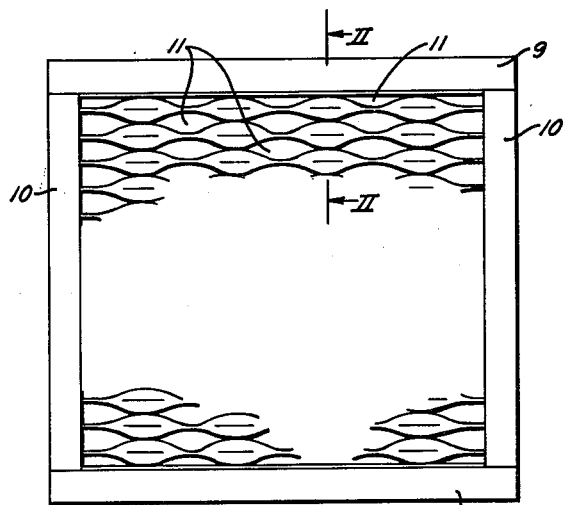

March 20, 1962 — J. J. SUMMERS ET AL — 3,025,964
ZIGZAG FILTER ELEMENT AND METHOD OF MAKING IT
Filed Sept. 29, 1958 — 6 Sheets-Sheet 1

INVENTOR.
JAMES J. SUMMERS and
ROBERT A. BUB
BY Brown, Critchlow, Flick & Peckham
Their Attorneys March 20, 1962  J. J. SUMMERS ET AL  3,025,964
ZIGZAG FILTER ELEMENT AND METHOD OF MAKING IT
Filed Sept. 29, 1958  6 Sheets-Sheet 2
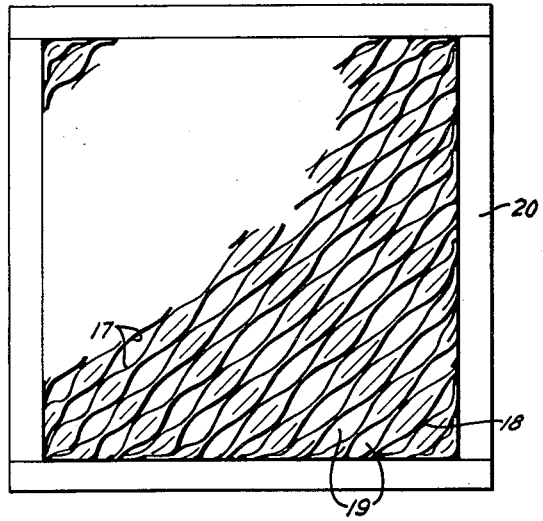
Fig. 5
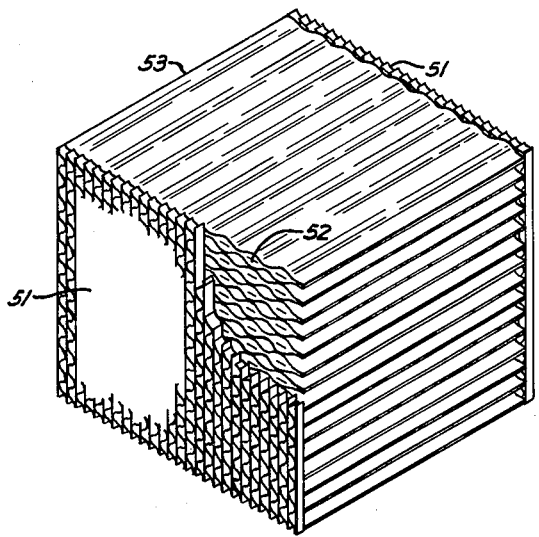
Fig. 19
Fig. 6
INVENTOR.
JAMES J. SUMMERS
and ROBERT A. BUB
BY
Brown, Critchlow, Flick & Peckham
Their Attorneys March 20, 1962 J. J. SUMMERS ET AL 3,025,964
ZIGZAG FILTER ELEMENT AND METHOD OF MAKING IT
Filed Sept. 29, 1958 6 Sheets-Sheet 3

INVENTOR.
JAMES J. SUMMERS and
ROBERT A. BUB
BY
Brown, Critchlow, Flick & Peckham
Their Attorneys March 20, 1962 J. J. SUMMERS ET AL 3,025,964
ZIGZAG FILTER ELEMENT AND METHOD OF MAKING IT
Filed Sept. 29, 1958 6 Sheets-Sheet 5

INVENTOR.
JAMES J. SUMMERS and
ROBERT A. BUB
BY
Brown, Critchlow, Flick & Peckham
Their Attorneys March 20, 1962   J. J. SUMMERS ET AL   3,025,964
ZIGZAG FILTER ELEMENT AND METHOD OF MAKING IT
Filed Sept. 29, 1958   6 Sheets-Sheet 6
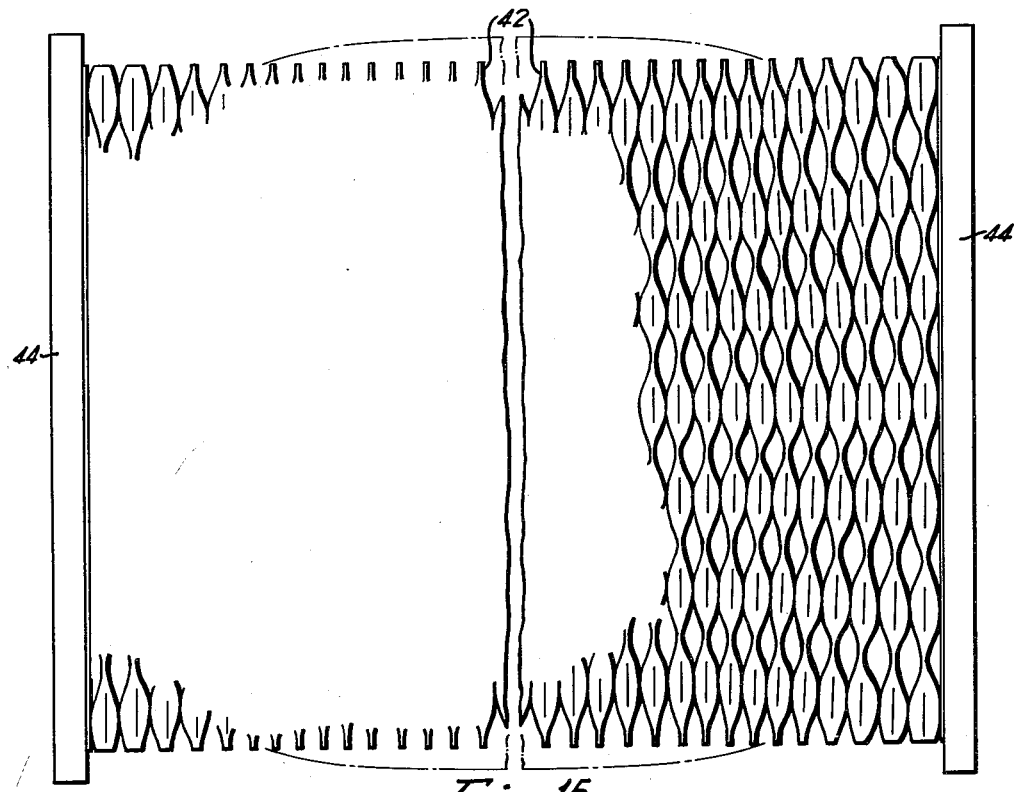
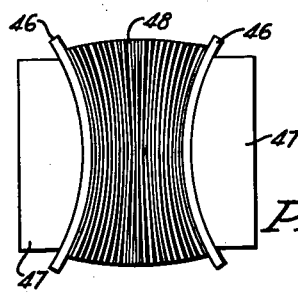
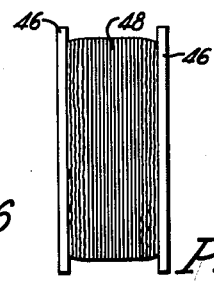
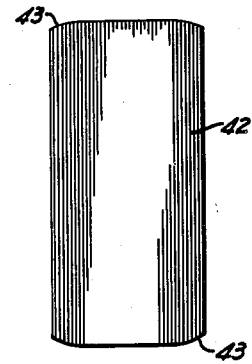
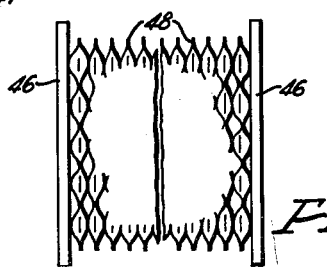
INVENTOR.
JAMES J. SUMMERS and
ROBERT A. BUB
BY
Brown, Critchlow, Flick & Peckham
Their Attorneys United States Patent Office 3,025,964
Patented Mar. 20, 1962

3,025,964
ZIGZAG FILTER ELEMENT AND METHOD OF MAKING IT
James J. Summers, Bethel Park, and Robert A. Bub, Penn Township, Pa., assignors to Mine Safety Appliances Company, Pittsburgh, Pa., a corporation of Pennsylvania
Filed Sept. 29, 1958, Ser. No. 763,948
15 Claims. (Cl. 210—493)

This invention relates to filters, and more particularly to a filter element made from a strip of filtering material folded into zigzag shape.

Zigzag filter elements are well known, but where the filtering material is quite flexible it has been necessary to place spacing members between the sheets in order to hold them apart as the fluid being filtered flows through them.

It is among the objects of this invention to provide a zigzag type filter element, in which separate spacing members are eliminated, in which the entire element is constructed from a single strip of the filtering material itself, in which the sealing problem is minimized, which has a large effective area and high dirt holding capacity; and which can be made easily in several different shapes.

In accordance with this invention, a long strip of flexible filtering material is folded transversely back and forth upon itself to form a stack of sheets. Each pair of adjoining sheets are joined together along a row of laterally spaced lines that extend lengthwise of the strip. The lines in each row are staggered relative to the lines in the row at opposite sides of it. The stack of sheets, expanded to form filter pockets between the sheets in the areas that are not joined together, is mounted in a frame or the like, where it is held in expanded condition. No separate spacing members between the sheets are required.

Figure 4:
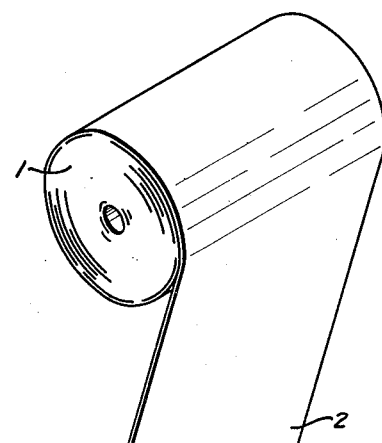
Figure 3:
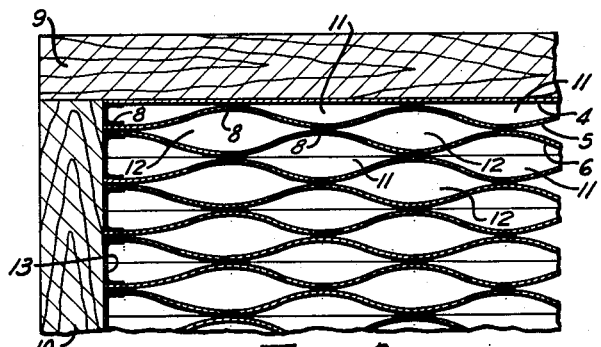
Figure 2:
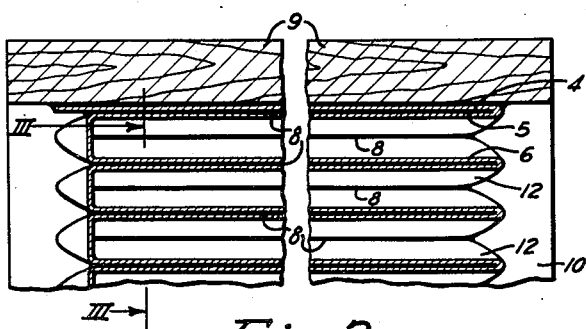
Figure 7:
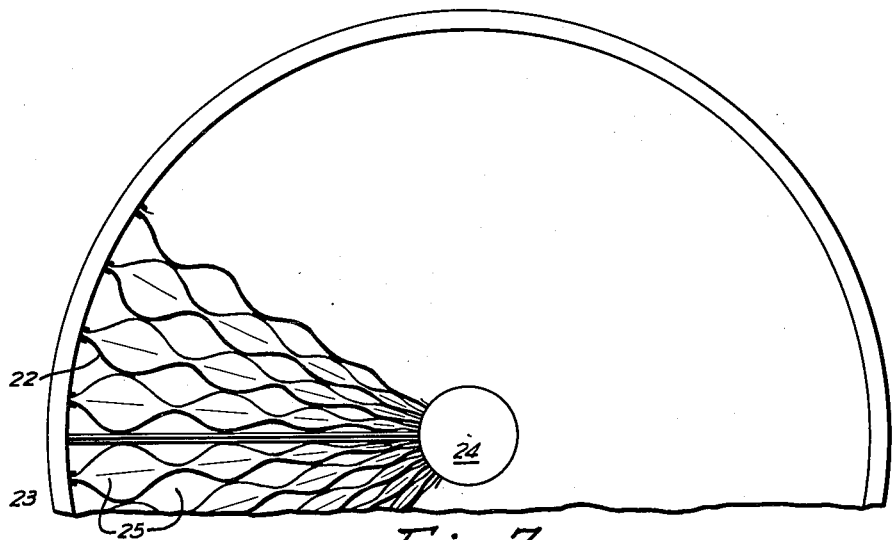
Figure 8:
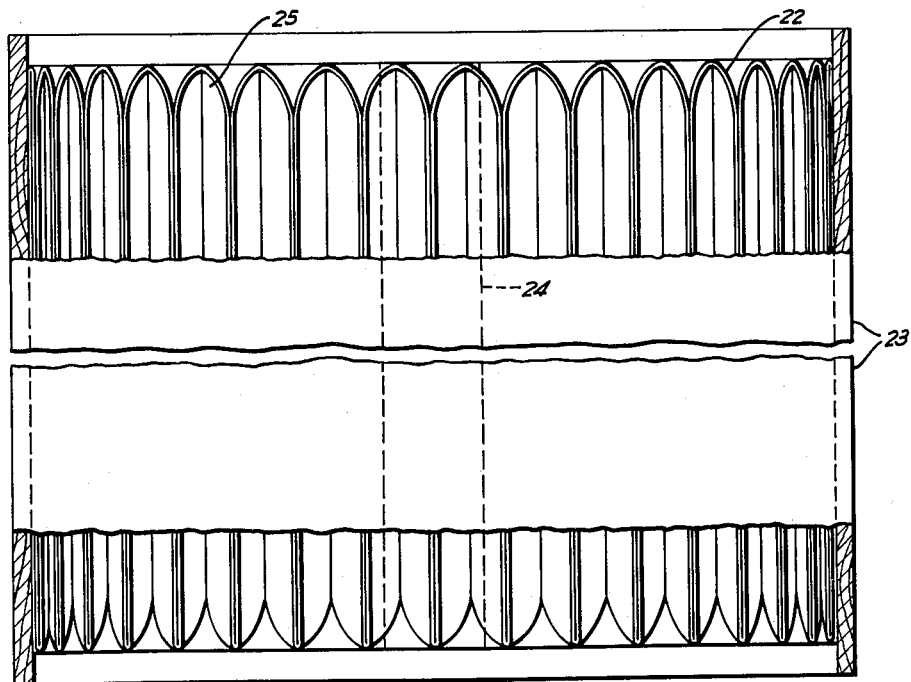
Figure 9:
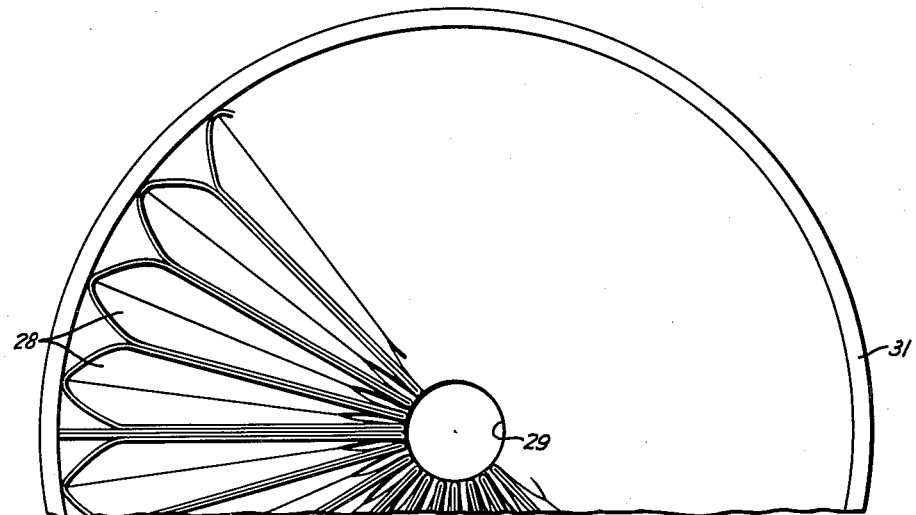
Figure 10:
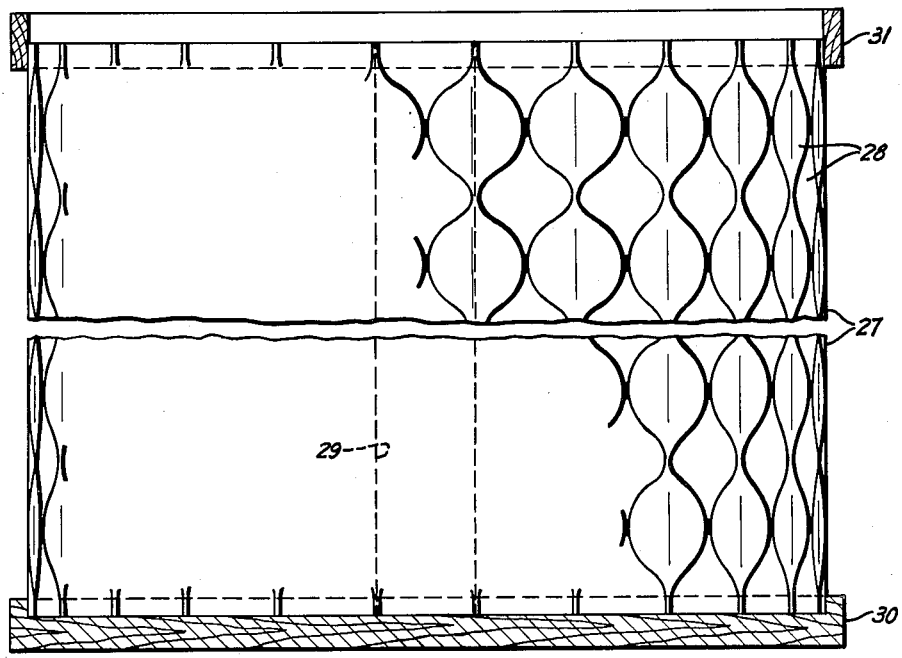
Figure 12:
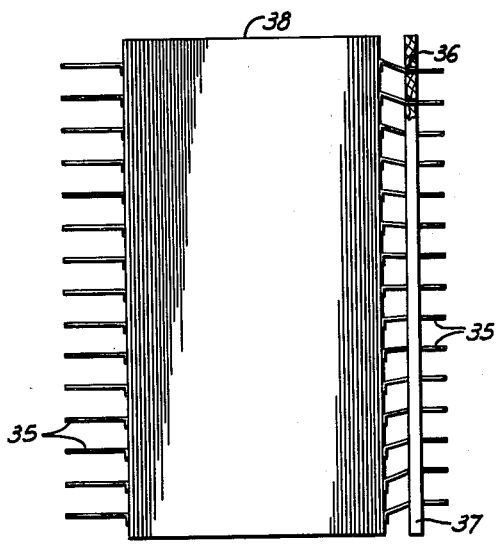
Figure 13:
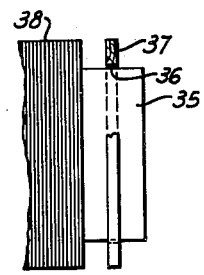
Figure 11:
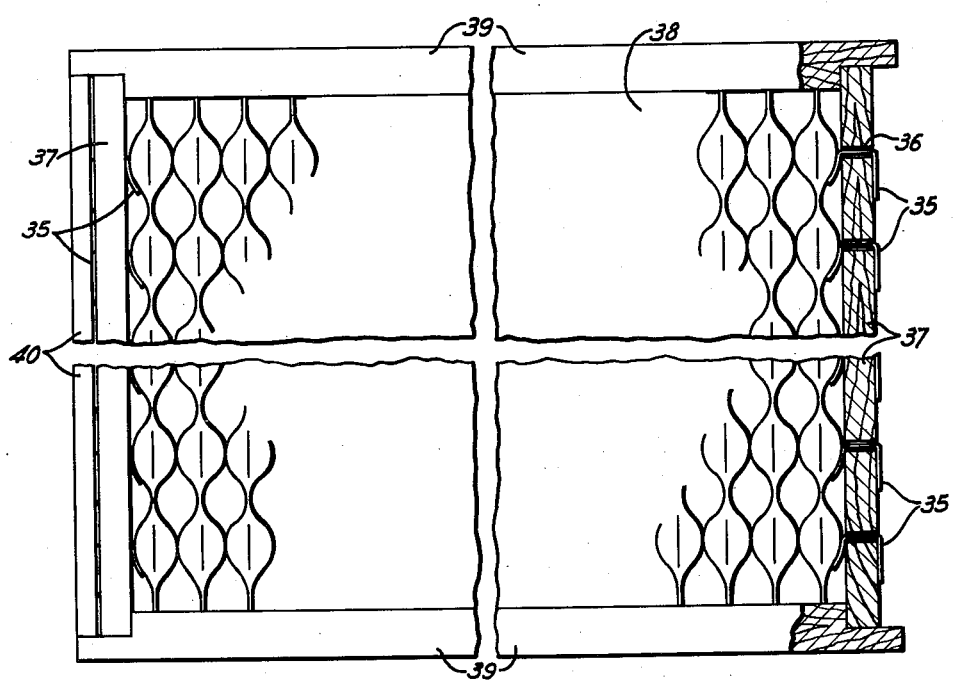

The invention is illustrated in the accompanying drawings, in which:

FIG. 1 is a view of one side of the filter, looking into the ends of half of the pockets;
FIG. 2 is an enlarged fragmentary cross section taken on the line II—II of FIG. 1;
FIG. 3 is a fragmentary cross section taken on the line III—III of FIG. 2;
FIG. 4 is a perspective view showing how the filter element is made;
FIG. 5 is a view, similar to FIG. 1, of a modification;
FIG. 6 is a perspective view showing how the filter element in FIG. 5 is made;
FIG. 7 is a fragmentary end view of a cylindrical filter;
FIG. 8 is a side view of the cylindrical filter;
FIGS. 9 and 10 are end and side views, similar to FIGS. 7 and 8, of another type of cylindrical filter;
FIG. 11 is a plan view of another embodiment;
FIGS. 12 and 13 are plan and side views of the filter element of this last embodiment before it is expanded;
FIG. 14 is a side view of another stack of filter sheets;
FIG. 15 is an enlarged side view of the stack expanded into a filter element in a frame;
FIG. 16 shows still another stack being fastened to curved panels;
FIG. 17 is a side view of the same stack after the panels have straightened;
FIG. 18 shows the filter made from the stack of the preceding figure; and
FIG. 19 is a perspective view, partly broken away, of a further embodiment of the invention.

Referring to FIG. 4 of the drawings, a roll 1 of flexible filter material, such as a long strip 2 of filter paper, is rotatably supported on a horizontal axis. The free end of the strip is pulled down to a suitable flat support 3. A predetermined length of the end portion of the strip then is laid down flat on the support and held there while the strip is folded back over it in the opposite direction. A flat filter sheet 4 is thus formed in engagement with the support. At the free edge of that sheet the strip is folded back again, whereby a second sheet 5 is formed on top of the first sheet, and a third sheet 6 is started. This folding back and forth is continued until a stack is formed containing the desired number of sheets. However, an intermediate operation is performed before each successive sheet is formed after the first one. This operation consists of joining each pair of adjoining sheets together along a row of laterally spaced lines that extend lengthwise of the strip.

This joining may be done in different ways, such as by stitching or stapling, but a simple way of doing it is to paint lines of adhesive 8 on the upper surface of each sheet. This can be done quickly with the help of a stencil, template, marking device or other suitable means. The line does not have to be continuous, but can be made up from a row of dots. After the adhesive has been applied to a sheet, the next sheet is folded down onto it so that the two sheets will be stuck together along the lines. The adhesive lines on successive sheets are staggered so that each row of lines is offset relative to the rows of lines directly above and below it. For best results with a rectangular filter element, the offset should be substantially half the distance between lines in any given row.

After the stack of sheets has been completed and they have all been joined together in the manner just described, the top sheet is cut from the strip hanging from the roll. When the filter is small, the top and bottom sheets, which form the two end sheets of the element, are then cemented to two flat rigid panels that will form opposite sides 9 of a filter frame. The two panels are then pulled away from each other far enough to expand the entire stack, somewhat like an accordian, and two more frame panels 10 are inserted between the ends of panels 9 to hold them apart. Of course, the sheets will not separate along the lines where they are joined together by adhesive, but the areas of the sheets between those lines will separate and thereby form parallel pockets, as shown in FIGS. 1, 2 and 3. About half of the pockets 11 will have their open ends at one side of the filter, and the other half 12 will have their open ends at the opposite side. After fastening the adjoining ends of the four panels together to form a rigid frame, sides 10 are masked and first one and then the other is dipped into a sealing compound to provide sealing material 13 between the edges of the filter sheets and the sides 10 of the frame, as shown in FIG. 3.

It will be seen that the filter first described is made from a continuous strip of filtering material and that the pockets cannot collapse even though the material is quite flexible and there are no spacing members to hold the pockets open. The elimination of such members and the time required to assemble them in the filter element reduces the cost of the element. Also, due to the absence of spacers, the filter has a greater effective area and can also hold more contaminant that it filters out of the fluid passing through it. It has greater strength and less weight for its size than similar filters known before. A filter element of any size can be made by using more or less sheets and by using a strip of any width which can be folded at any desired intervals.

The filter element shown in FIG. 5 is made from a section of a long strip 15 of filter paper that is fed down onto a support 16 as shown in FIG. 6. Each section of the strip tapers from its center toward its opposite ends to form elongated diamond-like shapes joined end to end. Starting with a short length of the small leading end of such a section, it is laid down flat on the support and held there while the strip is folded back over it in the opposite direction. The folding back and forth is continued as in FIG. 1 to form a stack of filter sheets 17, ending with the narrow upper end of the diamond shape section. During the zigzag folding, each pair of adjoining sheets are joined together along a row of laterally spaced lines 18 extending lengthwise of the strip. The lines in each row are staggered relative to the lines in the rows directly above and below. The lines of connection in each row are spaced progressively farther apart inwardly from the opposite ends of each sheet. Also, all of the ends of sheets 17 are sealed together so that the filter element itself is surrounded by an integral frame.

When such a diamond shape filter stack is expanded, a square can be formed in which the pockets 19 extend diagonally of the frame 20 housing the expanded element. Since all of the ends of the filter sheets have been sealed together first, there is no problem of leakage from the edges of the element. The variation in spacing of the lines joining the sheets results in the largest pocket being at the center of each pair of sheets and progressively smaller pockets extending toward the opposite ends of those sheets. This prevents some of the pockets from folding and crumpling, which they would do if all were potentially the same size because those extending along a diagonal line in the direction of expansion of the element are expanded more than those nearer the sides of the frame.

In FIGS. 7 and 8 a cylindrical filter is shown, in which the filter element 22 is made as shown in FIG. 4 and then is expanded and the two ends brought together and fastened in any suitable manner. The cylindrical element is inserted in an open end frame or shell 23 of the same shape, and the central axial opening is closed by a cap or plug 24. The pockets 25 are parallel to the axis of the filter and are located in rows radiating from the center. To permit the outer pockets to expand more than the inner ones, it is preferred that the spacing between the lines in each row that join the filter sheets together be progressively greater from the center of the filter outward.

A similar filter is shown in FIGS. 9 and 10, except that the filter element 27 is curved in the opposite direction from what it was in FIG. 7 when the stack of sheets is expanded. Consequently, each pocket 28 extends radially outward from the central axial passage 29. One end of the filter element is closed by a cover 30, but the other end, especially the end of the axial passage, is left open so that fluid can either enter or leave the passage and flow radially of the element through the pockets. The open end of the filter element can be retained in a ring 31.

If the filter element shown in FIG. 1 were long, it would neck down and be narrower at its center than at its opposite ends because the end sheets secured to the ends of the frame would prevent the end pockets from opening as much as those near the center of the filter. To avoid such a situation for large filter elements, the end sheets can be allowed to contract as much as the center sheets by following the system shown in FIGS. 11, 12 and 13. Instead of fastening the end sheets flat to the ends of a frame, a plurality of flexible tabs 35 are attached to the end sheets between the junction lines of the sheets. The tabs are passed through parallel slots 36 in end panels 37 and then are pulled to expand the filter stack 38. As the pockets expand in the direction of pull, they contract in the opposite direction so that the width of the stack becomes less. Since the end sheets are not attached to the panels, those sheets are free to bend and contract with the other sheets, whereby the expanded filter element remains rectangular instead of necked down. The slots in the panels preferably are spaced apart the same distance as the end pockets, as shown in FIG. 11.

While the filter element is held expanded, the side panels 39 of the frame are secured to the slotted panels to hold them apart, and then each tab is bent over the outer face of a slotted panel and glued or tacked to it. Excess tab lengths can be cut off. Finally, cover panels 40 are placed against the outer faces of the slotted panels to seal the slots and clamp and protect the tabs. The edges of the filter element can be sealed to the sides of the frame in the same manner as in FIG. 3.

Filter elements made in accordance with this invention can also be produced in shapes other than rectangular and cylindrical by precutting the filter strip and changing the location of the junction lines between the sheets.

Another way of avoiding the disadvantage of necking down as a long filter element is expanded is illustrated in FIGS. 14 and 15. In this case the ends of the filter stack 42 are tapered by trimming off its corner portions on a slant, such as shown at 43 in FIG. 14. The end sheets of the stack then are fastened to end panels 44 (FIG. 15) and the panels are pulled away from each other to expand the stack into a filter element. As the stack is expanded, its central portion is contracted in width from the dotted line position until the opposite sides of the filter element become substantially parallel from end to end as shown.

Still another way of accomplishing the same result is to bend the end panels 46 of the filter frame away from each other over blocks 47 and hold them there temporarily in any suitable manner, as shown in FIG. 16. The filter stack 48 is placed between the panels and its end sheets are cemented to the convex sides of the panels. The cementing is done along laterally spaced lines between the lines that join the opposite sides of the end sheets to the adjoining sheets. When the panels are released from the blocks and allowed to straighten into parallel relation as shown in FIG. 17, the end sheets will assume a wavy appearance and will not be quite as wide as the center sheets. The wavy end sheets will also compel the adjacent sheets to wave to some extent, so that the sides of the stack will be convex as shown. Consequently, when the stack is expanded and the central portion reduced in width, the opposite sides of the filter element will be drawn into parallel relation as indicated in FIG. 18.

A filter element with substantially parallel sides can also be made by the method illustrated by FIG. 19. A long expanded element is formed in the manner first described herein. The central portion of such as element will have substantially parallel sides, even though the end portions flare away from each other. A pair of perforated rectangular sheets 51 then are cemented to that central portion at the open ends of the filter pockets 52. After the adhesive has set, the portion of the element covered by the perforated sheets is cut from the rest of the element to produce a rectangular filter element 53 that is held expanded by sheets 51.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of making a zigzag filter element, comprising transversely folding a long plain-faced strip of flexible filtering material back and forth upon itself to form a stack of sheets while successively joining each pair of adjoining sheets together along a row of laterally spaced lines that extend lengthwise of the strip from substantially the junction of said pair of sheets to a point spaced from their opposite edge, the lines in each row being staggered laterally relative to the lines in the rows at opposite sides of it, and then expanding said stack several times its original thickness to form filter pockets between the sheets in the areas that are not joined along said lines.

2. The method of making a zigzag filter element, comprising folding a predetermined short length of a long plain-faced strip of filtering material transversely upon itself to form a pair of sheets, joining said sheets together along a row of laterally spaced lines that extend lengthwise of the strip from substantially the junction of said pair of sheets to a point spaced from their opposite edge, folding the strip in the opposite direction to provide a third sheet overlying the adjoining one, joining said third sheet and adjoining one together along a row of laterally spaced lines that extend lengthwise of the strip between the lines in the first row from substantially the junction of said pair of sheets to a point spaced from their opposite edge, repeating said folding and joining until a stack of the desired number of sheets has been provided, and then pulling the end sheets of the stack away from each other to separate and transversely curve the unjoined areas of all the sheets to form filter pockets between the sheets.

3. A zigzag filter element comprising a long strip of flexible filtering material folded transversely back and forth upon itself to form a plurality of filter sheets, each pair of adjoining sheets being joined together along a row of laterally spaced lines that extend lengthwise of the strip from substantially the junction of said pair of sheets to a point spaced from their opposite edge, the lines in each row being staggered laterally relative to the lines in the rows at opposite sides of it, and the unjoined areas of the sheets being held apart to form filter pockets with opposed concave walls.

4. In a rectangular frame, a zigzag filter element comprising a long plain-faced strip of flexible filtering material folded transversely back and forth upon itself to form a plurality of filter sheets, each pair of adjoining sheets being joined together along a row of laterally spaced lines that extend lengthwise of the strip from substantially the junction of said pair of sheets to a point spaced from their opposite edge, the lines in each row being staggered laterally relative to the lines in the rows at opposite sides of it, the unjoined areas of the sheets being spaced apart to form undulating sheets with filter pockets between them, and means securing the end sheets of the element to opposite sides of the frame to hold said pockets open.

5. A filter comprising a zigzag filter element formed from a long plain-faced strip of flexible filtering material folded transversely back and forth upon itself to form a plurality of filter sheets, each pair of adjoining sheets being joined together along a row of laterally spaced lines that extend lengthwise of the strip from substantially the junction of said pair of sheets to a point spaced from their opposite edge, the lines in each row being staggered laterally relative to the lines in the rows at opposite sides of it, the unjoined areas of the sheets being spaced apart to form undulating sheets with filter pockets between them, said element having an annular shape with said pockets extending radially thereof around an open central area, and a cover closing one end of said element and open area, the opposite end of said open area remaining open.

6. A filter comprising a zigzag filter element formed from a long plain-faced strip of flexible filtering material folded transversely back and forth upon itself to form a plurality of filter sheets, each pair of adjoining sheets being joined together along a row of laterally spaced lines that extend lengthwise of the strip from substantially the junction of said pair of sheets to a point spaced from their opposite edge, the lines in each row being staggered laterally relative to the lines in the rows at opposite sides of it, the unjoined areas of the sheets being spaced apart to form undulating sheets with filter pockets between them, said element having an annular shape with said pockets extending substantially parallel to its axis around an open central area, means sealing the spaces between the inner edges of the sheets around said central areas, and means encircling the filter element and sealing the spaces between the outer edges of the sheets.

7. A filter according to claim 6, in which the joining lines in each row are spaced progressively closer together as the axis of the filter element is approached.

8. The method of making a zigzag filter element, comprising transversely folding a long plain-faced strip of flexible filtering material back and forth upon itself to form a stack of sheets while successively joining each pair of adjoining sheets together along a row of laterally spaced lines that extend lengthwise of the strip from substantially the junction of said pair of sheets to a point spaced from their opposite edge, said strip tapering from its center toward its opposite ends so that the sheets are progressively narrower from the center sheet toward both end sheets, the lines in each row being staggered laterally relative to the lines in the rows at opposite sides of it, joining the edges of the sheets together, and then expanding said stack to form filter pockets between the sheets in the areas that are not joined along said lines.

9. The filter making method recited in claim 8, in which said lines in each row are spaced progressively farther apart inwardly from the opposite edges of the sheets, whereby each central filter pocket will be larger than those near the ends of the same row.

10. In a rectangular frame, a zigzag filter element comprising a long plain-faced strip of flexible filtering material folded transversely back and forth upon itself to form a plurality of filter sheets, said strip tapering from its center toward its opposite ends so that the sheets are progressively narrower from the center sheet toward both end sheets, each pair of adjoining sheets being joined together along a row of laterally spaced lines that extend lengthwise of the strip from substantially the junction of said pair of sheets to a point spaced from their opposite edge, the lines in each row being staggered laterally relative to the lines in the rows at opposite sides of it, the sheets undulating so that their unjoined areas are spaced apart to form filter pockets in rows extending diagonally of the frame, and means securing the edges of the sheets together and to the sides of the frame to hold said pockets open and to seal the space between the filter element and the frame.

11. In a rectangular frame, a zigzag filter element comprising a long plain-faced strip of flexible filtering material folded transversely back and forth upon itself to form a plurality of filter sheets, each pair of adjoining sheets being joined together along a row of laterally spaced lines that extend lengthwise of the strip from substantially the junction of said pair of sheets to a point spaced from their opposite edge, the lines in each row being staggered laterally relative to the lines in the rows at opposite sides of it, a pair of parallel panels in the frame between the end sheets of the element and the adjoining sides of the frame, each panel being provided with a plurality of parallel slots, means holding the panels against said sides of the frame, and flexible tabs secured to said end sheets between said lines and extending through said slots, the outer ends of the tabs being secured between said panels and frame sides to hold the filter element against the panels with the unjoined areas of the sheets spaced apart to form filter pockets.

12. The method of making a zigzag filter element, comprising transversely folding a long plain-faced strip of flexible filtering material back and forth upon itself to form a stack of sheets while successively joining each pair of adjoining sheets together along a row of laterally spaced lines that extend lengthwise of the strips from substantially the junction of said pair of sheets to a point spaced from their opposite edge, the lines in each row being staggered laterally relative to the lines in the rows at opposite sides of it, then expanding said stack to form filter pockets between the sheets in the areas that are not joined along said lines, fixing a predetermined length of the expanded stack in expanded condition, and cutting said length from the rest of the stack.

13. A zigzag filter element comprising a long strip of flexible filtering material folded transversely back and forth upon itself to form a plurality of filter sheets, each pair of adjoining sheets being joined together along a row of laterally spaced lines that extend lengthwise of the strip from substantially the junction of said pair of sheets to a point spaced from their opposite edge, the lines in each row being staggered laterally relative to the lines in the rows at opposite sides of it, and a pair of perforated sheets secured to the sides of the element perpendicular to said joining lines and holding the unjoined areas of the sheets apart to form filter pockets.

14. The method of making a zigzag filter element, comprising transversely folding a long plain-faced strip of flexible filtering material back and forth upon itself to form a stack of sheets while successively joining each pair of adjoining sheets together along a row of laterally spaced lines that extend lengthwise of the strip from substantially the junction of said pair of sheets to a point spaced from their opposite edge, the lines in each row being staggered laterally relative to the lines in the rows at opposite sides of it, tapering the end portions of the stack in a plane perpendicular to said lines, fastening the end sheets of the stack to parallel panels and pulling the panels apart to expand the stack into substantially rectangular shape with filter pockets between the sheets in the areas that are not joined along said lines.

15. The method of making a zigzag filter element, comprising transversely folding a long plain-faced strip of flexible filtering material back and forth upon itself to form a stack of sheets while successively joining each pair of adjoining sheets together along a row of laterally spaced lines that extend lengthwise of the strip from substantially the junction of said pair of sheets to a point spaced from their opposite edge, the lines in each row being staggered laterally relative to the lines in the rows at opposite sides of it, fastening the end sheets along laterally spaced lines to the convex surfaces of a pair of curved panels, said last-mentioned lines being staggered relative to the joining lines on the opposite sides of the end sheets, straightening said panels into parallel relation to provide the end sheets with waves, and then expanding said stack to form filter pockets between the sheets in the areas that are not joined together along said lines.

References Cited in the file of this patent

UNITED STATES PATENTS

| | | |
|---|---|---|
| 753,781 | Wundsch | Mar. 1, 1904 |
| 1,677,503 | Sweetland | July 17, 1928 |
| 1,906,984 | Lyman | May 2, 1933 |
| 2,142,894 | Grigg | Jan. 3, 1939 |
| 2,410,371 | Vokes | Oct. 29, 1946 |
| 2,553,054 | Lincoln | May 15, 1951 |
| 2,569,243 | Kovacs | Sept. 25, 1951 |
| 2,610,934 | Steele | Sept. 16, 1952 |
| 2,668,327 | Steele | Feb. 9, 1954 |

FOREIGN PATENTS

| | | |
|---|---|---|
| 686,418 | Great Britain | Jan. 21, 1953 |